United States Patent
Yamamoto

(10) Patent No.: US 8,253,543 B2
(45) Date of Patent: Aug. 28, 2012

(54) RFID TAG IDENTIFICATION INFORMATION MANAGEMENT SYSTEM

(75) Inventor: Kazutaka Yamamoto, Nagoya (JP)

(73) Assignee: Brother Kogyo Kabushiki Kaisha, Nagoya-Shi, Aichi (JP)

( * ) Notice: Subject to any disclaimer, the term of this patent is extended or adjusted under 35 U.S.C. 154(b) by 690 days.

(21) Appl. No.: 12/381,303

(22) Filed: Mar. 10, 2009

(65) Prior Publication Data

US 2009/0243814 A1    Oct. 1, 2009

(30) Foreign Application Priority Data

Mar. 26, 2008  (JP) .................................. 2008-080692

(51) Int. Cl.
- *H04Q 5/22* (2006.01)
- *G06K 15/00* (2006.01)
- *G06F 7/00* (2006.01)
- *G06F 15/177* (2006.01)

(52) U.S. Cl. .................. 340/10.52; 340/572.1; 235/383; 235/385; 707/600; 707/E17.044; 707/999.1; 709/220; 709/222; 709/245

(58) Field of Classification Search .... 340/572.1–572.9, 340/10.5–10.52, 9.16; 235/375, 376, 492, 235/385; 713/156, 160, 165, 167–170, 176–181, 713/189–190, 200; 709/225, 250, 220–222, 709/245; 707/600, E17.044, 999.1
See application file for complete search history.

(56) References Cited

U.S. PATENT DOCUMENTS

| | | | | |
|---|---|---|---|---|
| 7,701,341 B2 * | 4/2010 | Kumar et al. | | 340/572.1 |
| 2002/0004767 A1 | 1/2002 | Okamoto | | |
| 2005/0251678 A1 | 11/2005 | Okamoto | | |
| 2007/0262864 A1 * | 11/2007 | Yasui et al. | | 340/572.1 |

FOREIGN PATENT DOCUMENTS

| | | |
|---|---|---|
| JP | 2004-078952 | 3/2001 |
| JP | 2002-024767 | 1/2002 |
| JP | 2005149174 | 6/2005 |
| JP | 2006133841 | 5/2006 |
| JP | 2007-179324 | 7/2007 |

\* cited by examiner

*Primary Examiner* — Daniel Wu
*Assistant Examiner* — Mancil Littlejohn
(74) *Attorney, Agent, or Firm* — McCarter & English, LLP

(57) ABSTRACT

In a RFID tag information system having a plurality of service servers, a single unified server, an operation terminal, an apparatus for producing RFID tags, and a portable terminal, the unified server has a common database storing a list of unissued tag IDs allocatable to an unproduced RFID tag and further storing the tag ID allocated to the produced RFID tag and registration data corresponding to the tag ID, and the apparatus for producing RFID tags writes the tag ID obtained through an apparatus antenna for radio communication with a RFID circuit element provided at a tag tape, the service server allocated by the unified server, and the operation terminal in an IC circuit part through the apparatus antenna.

6 Claims, 11 Drawing Sheets

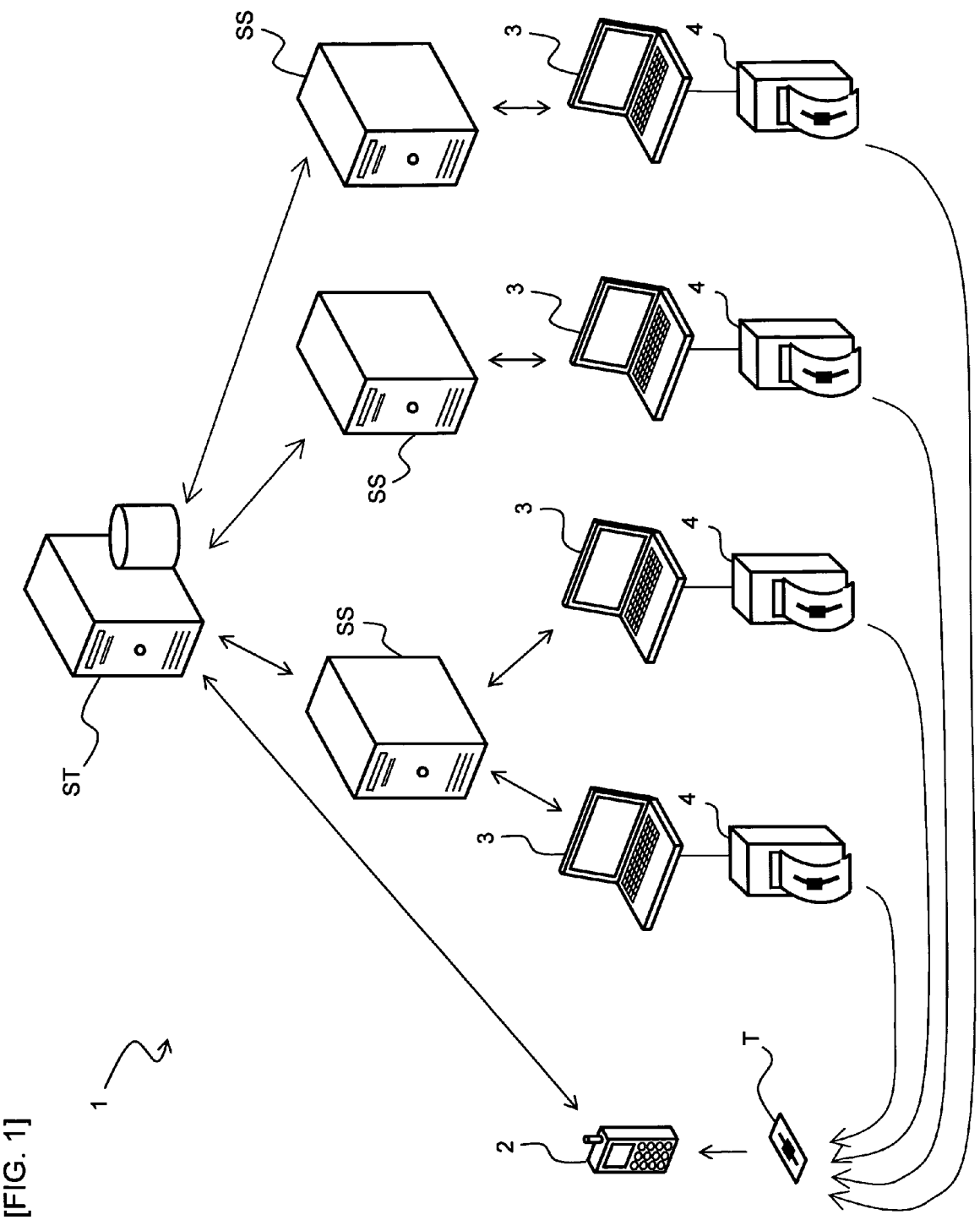
[FIG. 1]

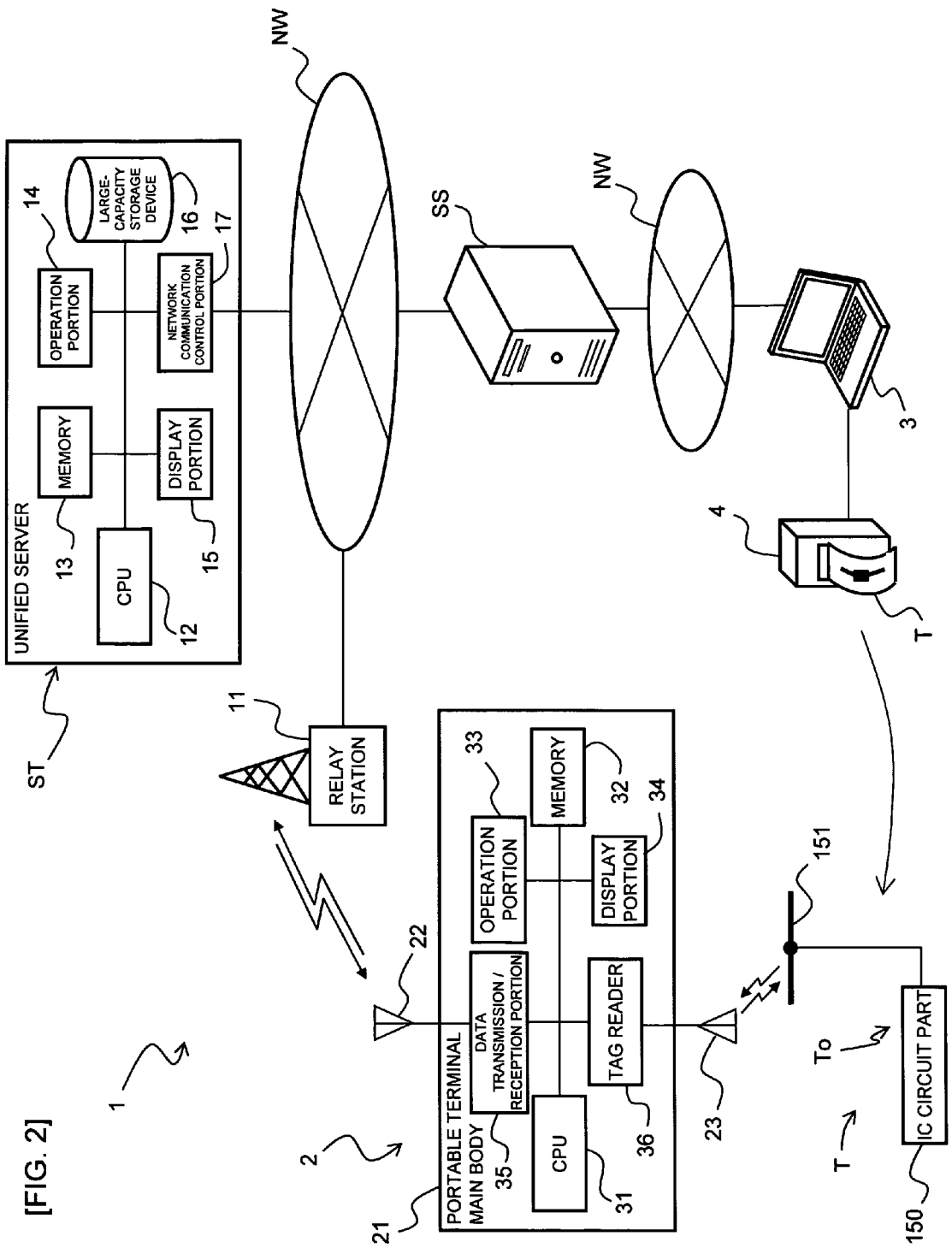

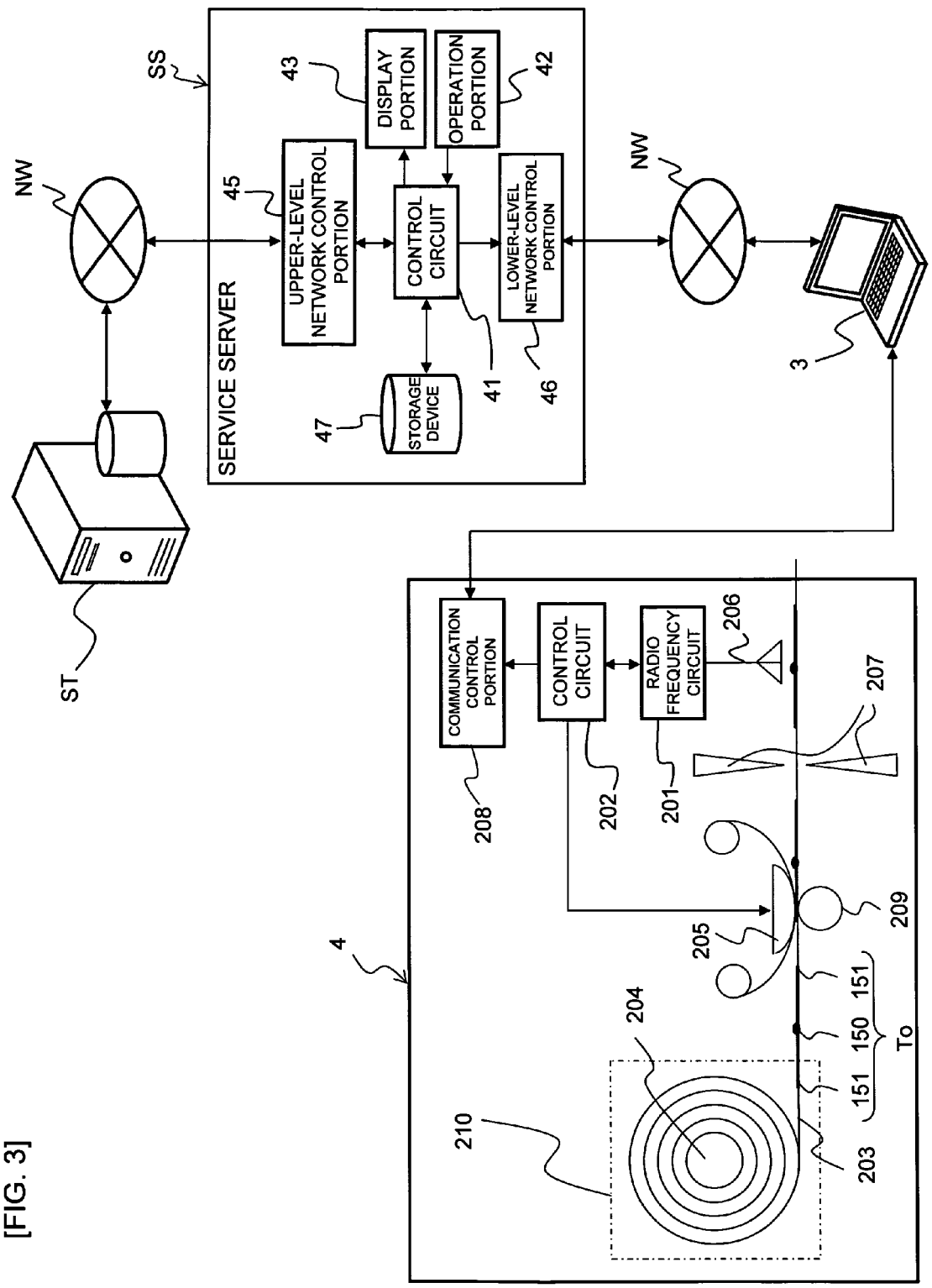
[FIG. 3]

[FIG. 4]
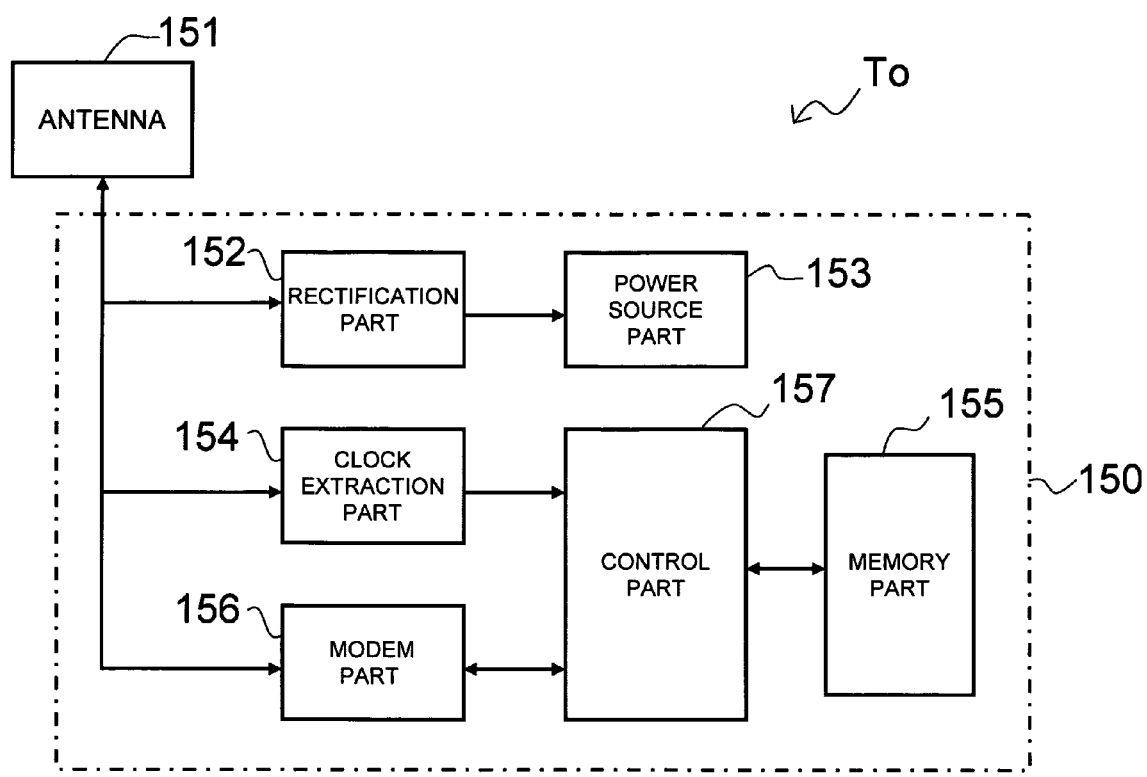

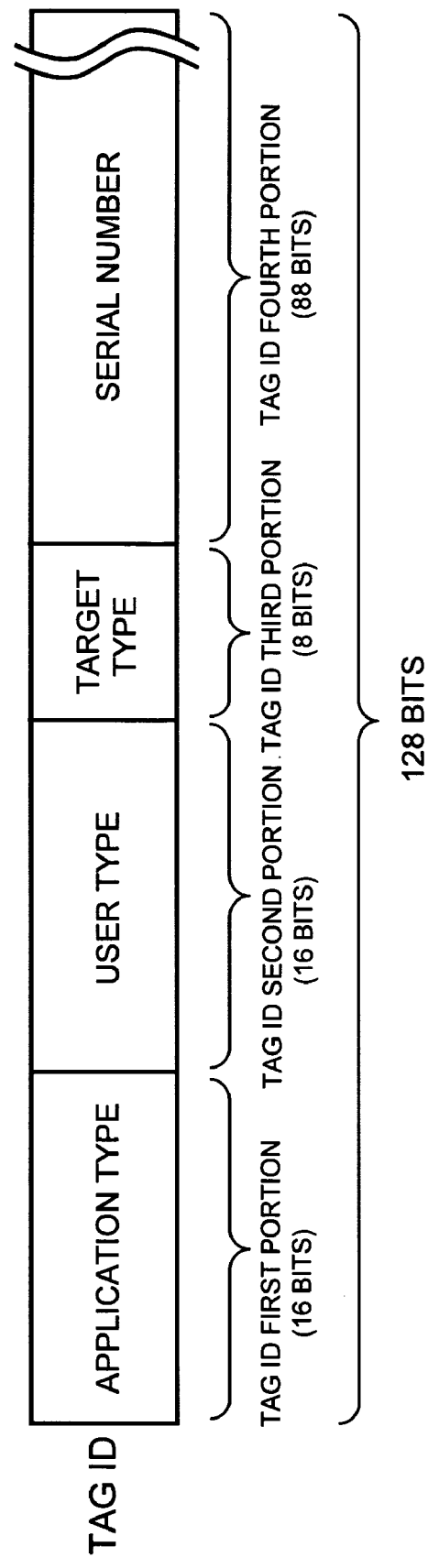
[FIG. 5]

[FIG. 6A]

APPLICATION TYPE TABLE

| TAG ID FIRST PORTION | APPLICATION TYPE |
|---|---|
| 008C | LIBRARY COLLECTION MANAGEMENT |
| . . | . . |
| 015D | RESTAURANT SEARCH |
| . . | . . |
| 03E2 | EXHIBITION MANAGEMENT |
| . . | . . |

[FIG. 6B]

USER TYPE TABLE

| TAG ID SECOND PORTION | USER TYPE |
|---|---|
| 0142 | NAGOYA LIBRARY |
| . . | . . |
| 03B7 | JAPANESE RESTAURANT "UNARYO" |
| . . | . . |
| OA6E | PREFECTURAL INDUSTRIAL HALL |
| . . | . . |

[FIG. 6C]

TARGET TYPE TABLE

| TAG ID THIRD PORTION | TARGET TYPE |
|---|---|
| 2E | BOOK |
| . . | . . |
| 6A | SHOP |
| . . | . . |
| B5 | EXHIBITION EVENT |
| . . | . . |

[FIG. 7]

UNISSUED TAG ID LIST

| UNISSUED TAG ID |
|---|
| (ISSUED) |
| (ISSUED) |
| 008C014422E0000000000000000007C28F |
| 008C014422E0000000000000000007C290 |
| 008C014422E0000000000000000007C291 |
| ⋮ |

[FIG. 8]

REGISTRATION DATA OF BOOK (XML FORMAT DATA)

1 DATA
```
<tag id="008C01422E0000000000000000007C28E">
    <title>ILLUSTRATED INFORMATION THEORY </title>
    <category>BOOK </category>
    <application>LIBRARY COLLECTION MANAGEMENT</application>
    <user>NAGOYA LIBRARY</user>
    <group>any</group>
    <security>false</security>
    <option>
        <name>ILLUSTRATED INFORMATION THEORY</name>
        <author>INFORMATION INSTITUTE</author>
        <category>INFORMATION ENGINEERING</category>
        <isbn>123-4-567</isbn>
        <publish>JOHO SHOIN</publish>
        <sonata>ILLUSTRATE THE LATEST INFORMATION THEORY EASILY
                TO BE UNDERSTOOD WITH MANYILLUSTRATIONS...</sonata>
    </option>
</tag>
```

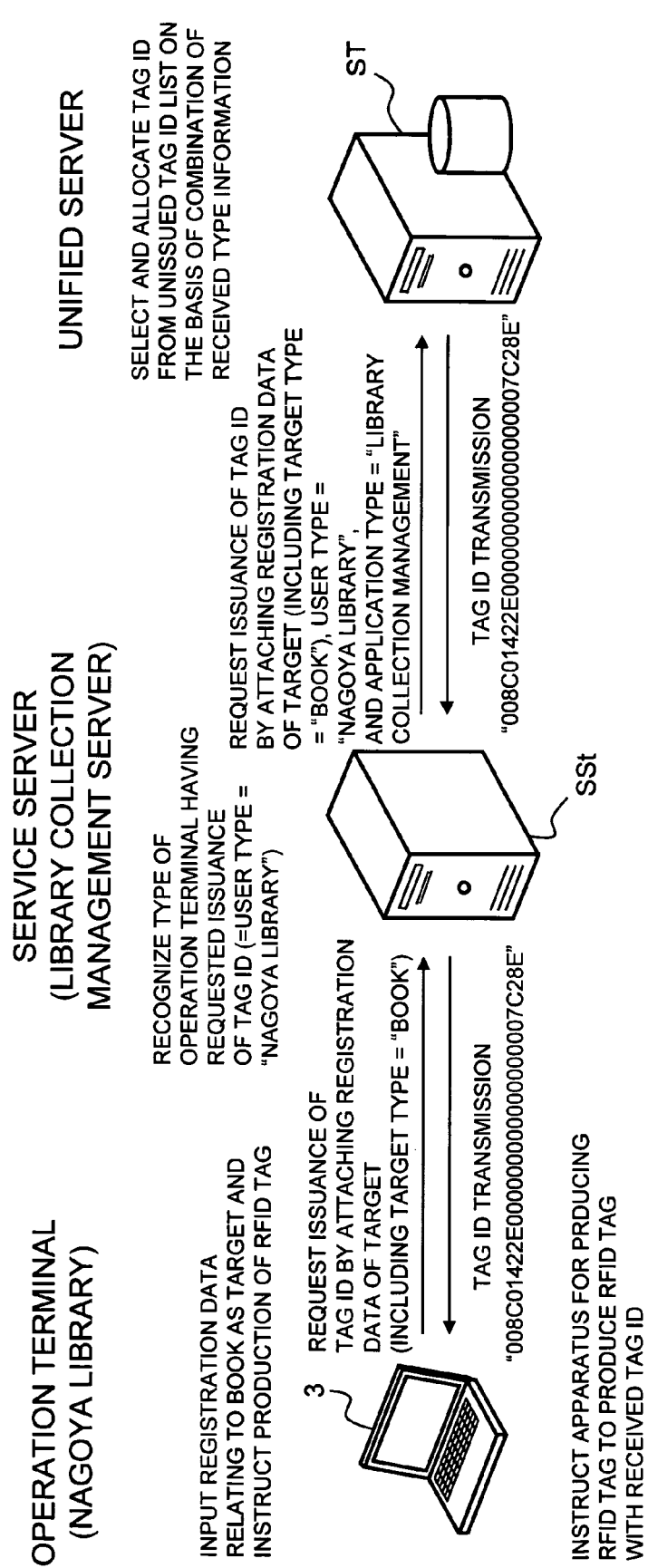
[FIG. 9]

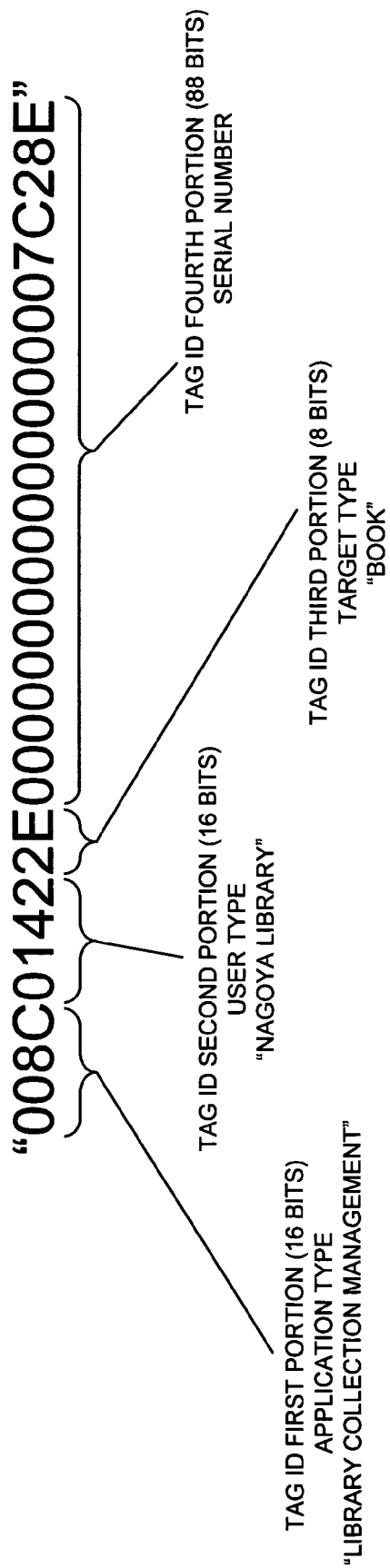
[FIG. 10]

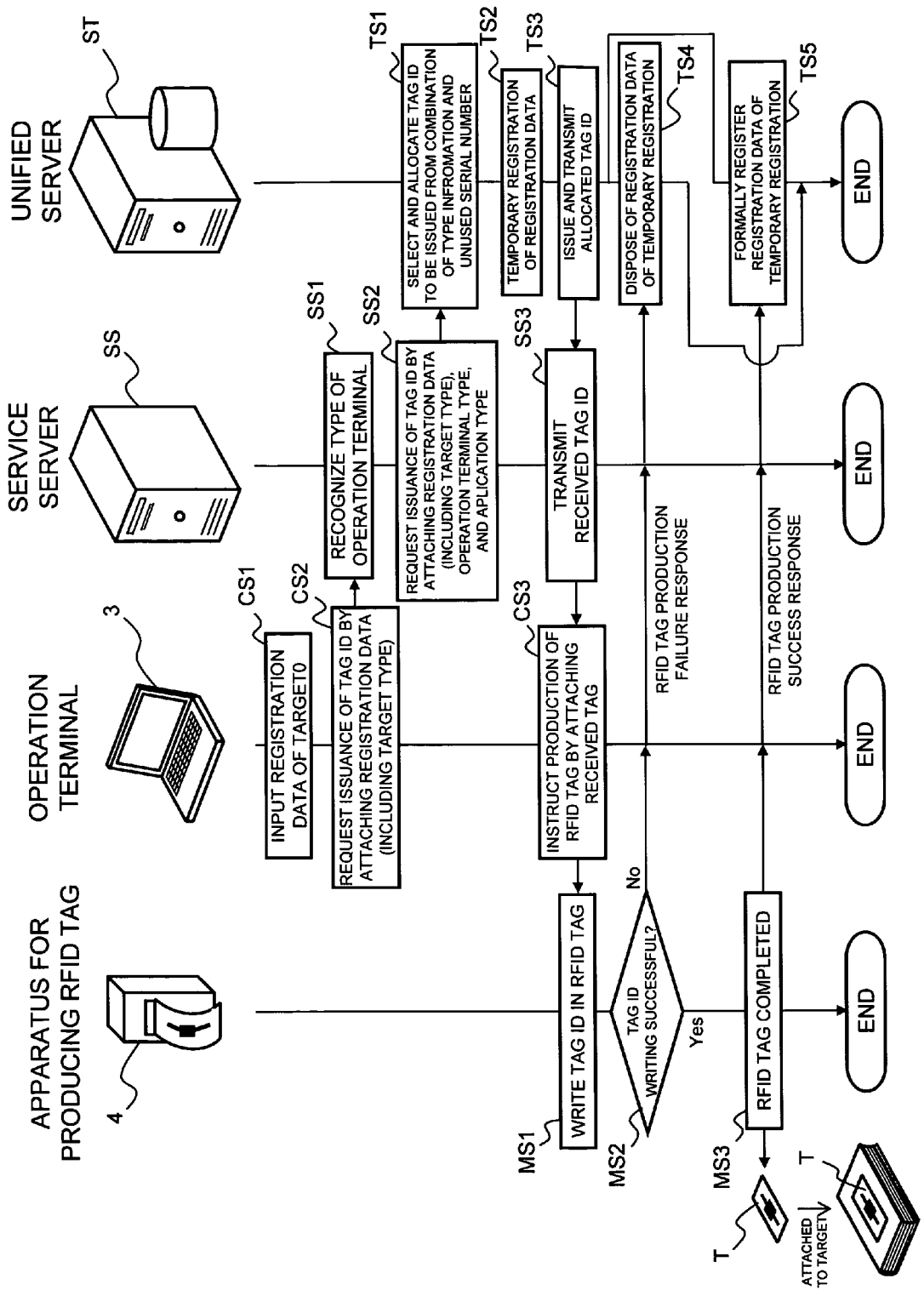
[FIG. 11]

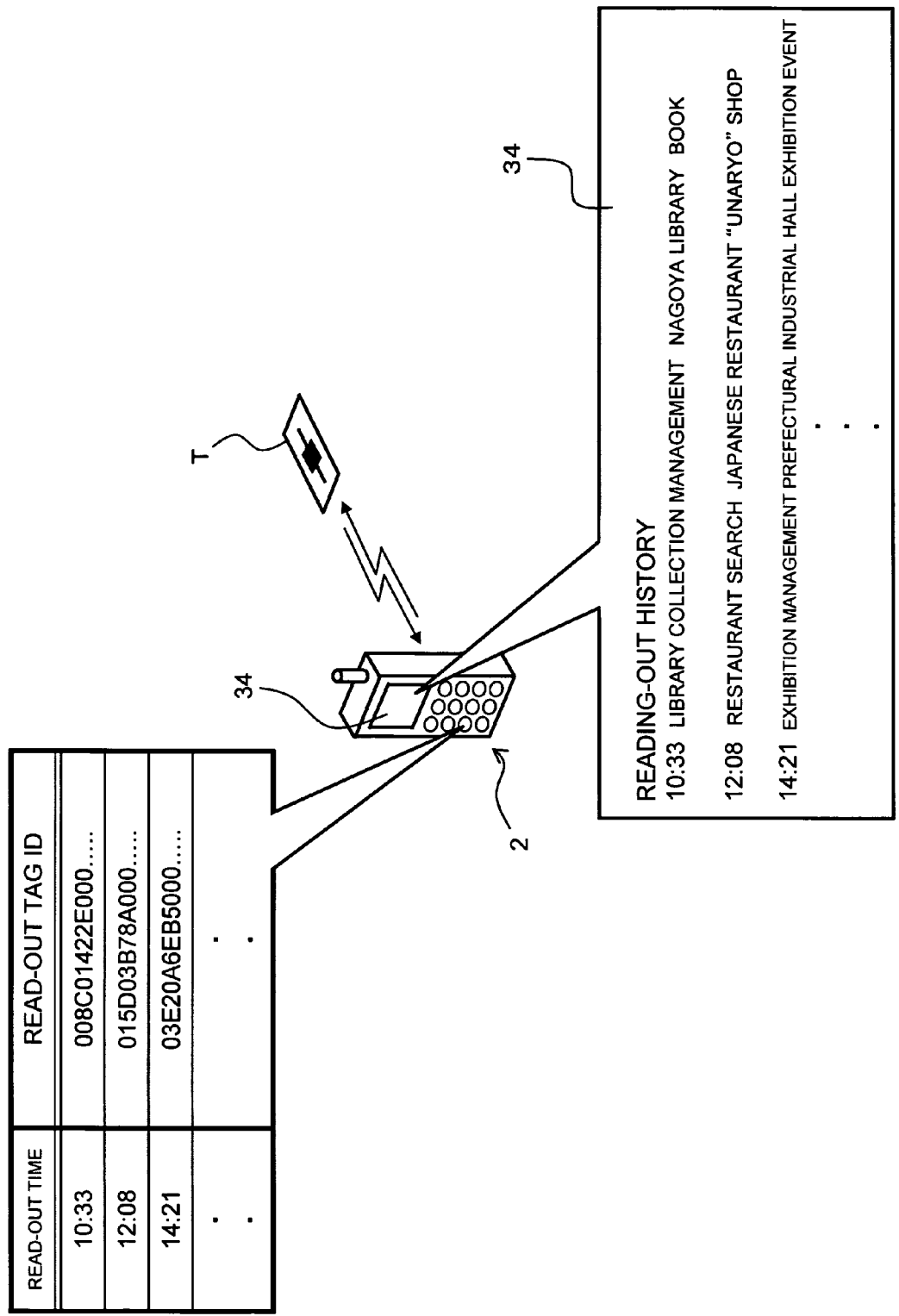

RFID TAG IDENTIFICATION INFORMATION MANAGEMENT SYSTEM

CROSS-REFERENCE TO RELATED APPLICATIONS

This application claims priority from JP 2008-080692, filed Mar. 26, 2008, the contents of which are hereby incorporated by reference.

BACKGROUND OF THE INVENTION

1. Field of the Invention

The present invention relates to a RFID tag identification information management system that unifies management of RFID tag identification information given to each RFID tag.

2. Description of the Related Art

Prior arts for issuing a RFID tag (IC card) provided with tag identification information (ID number) to a user using various services include the one described in JP,A, 2005-149174.

In this prior art, as a service server (service managing device) that manages a plurality of services to be offered to a user, a point management device, a campaign managing device, and a promotion item offering managing device are provided. In order to manage issuance of the RFID tag, a user management server is provided. The point managing device, the campaign managing device, the promotion item managing device, and the user management server are connected to each other via a wired or radio communication line.

The point managing device manages a point service to be given to a user and stores personal information according to service of the user who registered use of the service in association with the tag identification information in a point management database. The campaign managing device manages a campaign service carried out for the user and stores the personal information according to service of the user who registered use of the service (such as an accumulated purchase number indicating the total number of purchases of campaign goods and the like) in association with the tag identification information in a campaign management database. The promotion item offering managing device manages promotion item offering service carried out for the user and stores the personal information according to service such as a service use history of the user who registered use of the service in association with the tag identification information in a promotion item offering management database.

In the above prior arts, when a user registration is applied, the user management server confirms that the user has not made registration yet and then, registers the tag identification information in association with user information in the user management database and issues a corresponding RFID tag. Then, each service managing device offers services individually while identifying each user by using the tag identification information given by the user management server to each RFID tag.

Here, in general, when a RFID tag is to be issued in an application using a RFID tag, information corresponding to (so-called in association with) tag identification information used for the issued RFID tag (the three types of service information by user in the above example) is registered in each corresponding database. Here, the user management server is provided in common to users who use each service, and a work to issue a RFID tag is centrally managed. However, at the issuance, an arbitrary value obtained at the time of issuance is used as it is for the tag identification information, and it is not configured such that tag identification information which is systematically different according to the type of the service information by user is used or the like. If the tag identification information itself can be constructed and used capable of systematic classification according to predetermined regularity (systematized with a rule so that the service to be used by the user is made clear in the above example), even without getting the service information by user itself by accessing the database using the tag identification information as a key after the RFID tag is read out, stored data contents (service contents of the user) can be estimated to some degree from the configuration itself of the tag identification information. As a result, if various processing is to be carried out after reading out of the RFID tag, the processing procedure can be simplified and expedited and should be convenient. However, such points are not given particular consideration in the above prior arts.

SUMMARY OF THE INVENTION

The present invention has an object to provide a management system of RFID tag identification information that can estimate stored data contents from configuration itself of the tag identification information and can improve convenience for users by constructing the tag identification information capable of systematic classification.

BRIEF DESCRIPTION OF THE DRAWING

FIG. 1 is a system configuration diagram illustrating an entire RFID tag information system of an embodiment of the present invention.

FIG. 2 is a functional block diagram illustrating a detailed function of a unified server and a portable terminal in the RFID tag information system.

FIG. 3 is a functional block diagram illustrating a detailed function of a service server and an apparatus for producing RFID tags in the RFID tag information system.

FIG. 4 is a block diagram illustrating an example of functional configuration of a RFID circuit element provided at a RFID tag.

FIG. 5 is a diagram illustrating an example of data configuration of a tag ID to be stored in the RFID circuit element of the RFID tag.

FIGS. 6A to 6C are diagrams conceptually illustrating an example of a table on type information corresponding to each portion of a data structure of the tag ID.

FIG. 7 is a diagram conceptually illustrating an example of an unissued tag ID list.

FIG. 8 is a diagram for explaining registration data described in the XML format.

FIG. 9 is a diagram for conceptually explaining a flow of information around the service server and its processing when the RFID tag is to be produced.

FIG. 10 is a diagram for explaining type information corresponding to each portion in the data structure of the tag ID shown in FIG. 9.

FIG. 11 is a sequence diagram illustrating a control operation and a response of the apparatus for producing RFID tags, an operation terminal, the service server, and the unified server in a process that produces the RFID tag.

FIG. 12 is a diagram illustrating an example to produce a memo through reading-out by the potable terminal.

DETAILED DESCRIPTION OF THE PREFERRED EMBODIMENTS

An embodiment of the present invention will be described below referring to the attached drawings.

FIG. 1 is a system configuration diagram illustrating an entire RFID tag information system to which a management system of RFID tag identification information of this embodiment is applied.

A RFID tag information system 1 shown in FIG. 1 comprises a RFID tag T storing information, a portable terminal (RFID tag reading device) 2 having a tag reading function that reads out information from the RFID tag T via radio communication, a wireless phone function capable of a call and information transmission/reception by connecting to a telephone line via radio communication, and an information processing function capable of information processing, an apparatus 4 for producing a RFID tag that produces the RFID tag T, an operation terminal 3 configured by a general-purpose computer, for example, and connected to the apparatus 4 for producing a RFID tag, respectively, a plurality of service servers SS that provide different types of services by individual applications to the operation terminals 3, respectively, connected through a network, and a single unified server ST that connects to the portable terminal 2 and the service server SS through the telephone line and the network and can transmit/receive information.

In the RFID tag T, specific identification information uniquely defined without duplication at production thereof (tag identification information; hereinafter referred to as tag ID) is written and stored, and the portable terminal 2 can read out the tag ID from the RFID tag T by means of the tag reading function.

FIG. 2 is a functional block diagram illustrating a detailed function of the unified server ST and the portable terminal 2 in the RFID tag information system 1.

In FIG. 2, the unified server ST is connected to the plurality of service servers SS (only one of them is shown in the figure) and a relay station 11 (that carries out radio communication with the portable terminal 2) through a wide-area network NW such as the Internet. Also, each service server SS is connected to the operation terminal 3 through the wide-area network NW such as the Internet or a local network such as LAN (not particularly shown) according to the respective use forms. Further, each operation terminal 3 is directly connected to the apparatus 4 for producing a RFID tag.

The unified server ST comprises a CPU (central processing unit) 12, a memory 13 made of a RAM, a ROM and the like, for example, an operation portion 14 to which an instruction and information are input from a system administrator, a display portion 15 that displays various information and messages, a large-capacity storage device 16 made of a hard disk device and functioning as a common database in which a tag ID of a RFID tag T and information relating to an installation target of the RFID tag T (article information, personal information and the like; target data) and the like are registered and stored, and a network communication control portion 17 that controls transmission/reception of an information signal with the portable terminal 2 (via the relay station 11) and the service server SS via the wide-area network NW.

The CPU 12 of the unified server ST carries out signal processing according to a program stored in advance in the ROM while using a temporary storing function of the RAM, by which various information signals are transmitted/received with the portable terminals 2 and the service servers SS.

The portable terminal 2 is constituted by a portable terminal main body 21, a main antenna 22 that carries out radio communication with the wide-area network NW through the relay station 11, and a reader antenna (reading device antenna) 23 that carries out the radio communication with the RFID tag T.

The portable terminal main body 21 comprises a CPU 31, a memory 32 similar to the above, an operation portion 33, a display portion (type display device) 34, a data transmission/receiving portion 35 that carries out transmission/reception of an audio signal and a data signal of a call through the main antenna 22, and a tag reader (information reading device) 36 that reads out the tag ID from the RFID tag T through the reader antenna 23.

An example in which the portable terminal 2 is connected to the unified server ST via the wide-area network NW (Internet) constituted by a wireless telephone line through the relay station 11 is shown, but other than that, the terminal may be connected via the wide-area network NW through a wireless LAN and the like, and in this case, the terminal may be specialized in an information communication function that transmits/receives only a data signal by excluding the telephone function for transmission/receiving of an audio signal of a call from the portable terminal 2.

The RFID tag T has a RFID circuit element To provided with a tag antenna 151 and an IC circuit part 150, and the RFID circuit element To is provided on a base material, not particularly shown (the RFID circuit element To will be described later in detail).

FIG. 3 is a functional block diagram illustrating a detailed function of the service server SS and the apparatus 4 for producing a RFID tag in the RFID tag information system 1. Since the operation terminal 3 is constituted by a commercial general-purpose computer sold in the market as mentioned above, description on detailed configuration will be omitted.

In FIG. 3, the service server SS comprises a control circuit 41 including a CPU and a memory, an operation portion 42, a display portion 43, a storage device 47 that stores various information suitable to services to be offered, an upper-level network control portion 45 that controls information transmission/reception with the unified server ST via the wide-area network NW, and a lower-level network control portion 46 that controls information transmission/reception with the operation terminal 3 via the wide-area network NW or a local network (not particularly shown).

On the other hand, the apparatus 4 for producing a RFID tag has a holder portion 210 for a roll of a tape with RFID tags to which a roll 204 of a tape with RFID tags can be detachably attached (or a cartridge provided with the roll 204 of a tape with RFID tags can be detachably attached) around which a tag tape provided with the RFID circuit elements To with a predetermined interval (tag medium; actually it is wound in the spiral state but simplified and shown with a concentric circle) 203, a print head 205 configured to apply a desired print on a region corresponding to the RFID circuit element To in the tag tape 203 fed out of the roll 204 of a tape with RFID tags, an apparatus antenna (producing apparatus antenna) 206 configured to carry out transmission/reception of information via radio communication with the RFID circuit element To, a radio frequency circuit 201, a control circuit 202, a communication control portion 208 configured to control communication with the operation terminal 3, a cutter 207 configured to cut the tag tape 203 for which print on the tag tape 203 and the information writing in the RFID circuit element To have been finished to a predetermined length to have the RFID tag T, and a feeding device 209 provided opposite to the print head 205 and configured to feed the roll 204 of a tape with RFID tags under control of the control circuit 202.

The radio frequency circuit 201 and the control circuit 202 create access information of the IC circuit part 150 of the RFID circuit element To, transmit it to the RFID circuit element To via the apparatus antenna 206 and write the information in (and read the information from) the IC circuit part 150 of the RFID circuit element To. The control circuit 202 is connected to the operation terminal 3 via the communication control portion 208 and is capable of information transmission/reception with the operation terminal 3.

In such a configuration, when the RFID tag T is to be produced by the apparatus 4 for producing a RFID tag, an operator operates the operation terminal 3 so as to input setting of print information and the like to be printed on the surface of the RFID tag T and to input a production instruction of the RFID tag T. As a result, as will be described later, the operation terminal 3 obtains a tag ID newly issued from the unified server ST via the service server SS. Then, by means of the control of the operation terminal 3 and the control circuit 202 of the apparatus 4 for producing a RFID tag, the print is applied by the print head 205 on the basis of the setting input information, and the access information is created by the radio frequency circuit 201 and transmitted to the RFID circuit element To via the apparatus antenna 206. As a result, the tag ID obtained as above is written in (and information is read out from) the IC circuit part 150 of the RFID circuit element To, and the RFID tag T is produced.

FIG. 4 is a block diagram illustrating an example of functional configuration of the RFID circuit element To provided at the RFID tag T.

In FIG. 4, the RFID circuit element To has the tag antenna 151 configured to transmit/receive a signal in a non-contact manner with a reader antenna 23 of the portable terminal 2 as mentioned above and the IC circuit part 150 connected to the tag antenna 151.

The IC circuit part 150 has a rectification part 152 configured to rectify an interrogation wave received by the tag antenna 151, a power source part 153 configured to accumulate energy of the interrogation wave rectified by the rectification part 152 so as to make it a driving power source, a clock extraction part 154 configured to extract a clock signal from the interrogation wave received by the tag antenna 151 and to supply it to a control part 157, a memory part 155 that can store predetermined information signals, a modem part 156 connected to the tag antenna 151, and the control part 157 configured to control operation of the RFID circuit elements To through the memory part 155, the clock extraction part 154, the modem part 156 and the like.

The modem part 156 demodulates an interrogation wave from the reader antenna 23 of the portable terminal 2 received by the tag antenna 151 and modulates a reply signal from the control portion 157 and transmits it as a response wave (signal including the tag ID) from the tag antenna 151.

The clock extraction part 154 extracts a clock component from a received signal and supplies a clock corresponding to a frequency of the clock component of the received signal to the control part 157.

The control part 157 executes basic control such as interpretation of a received signal demodulated by the modem part 156, generation of a reply signal based on the information signal stored in the memory part 155, reply of it by the modem part 156 from the tag antenna 151 and the like.

FIG. 5 is a diagram illustrating an example of data configuration of the tag ID to be stored in the RFID circuit element To of the RFID tag T.

In the example shown in FIG. 5, the tag ID is data with the total length of 128 bits, and a tag ID first portion constituted by the first 16 bits in them, a tag ID second portion constituted by the subsequent 16 bits, a tag ID third portion constituted by the subsequent 8 bits, and a tag ID fourth portion constituted by the subsequent remaining 88 bits are provided separately.

The tag ID first portion (first portion) is a section corresponding to a type of application, and identification information corresponding to the type of individual applications (services to be offered) of the service server SS relating to the RFID tag T storing the tag ID is stored in this section.

The tag ID second portion (second portion) is a section corresponding to a type of user, and identification information corresponding to the type of the operation terminal 3 (operation terminal, user) producing the RFID tag T storing the tag ID is stored in this section.

The tag ID third portion (third portion) is a section corresponding to a type of information relating to an installation target of the RFID tag T (=article information, personal information and the like; target data), in other words, a type of the installation target of the RFID tag T (article, person and the like). The identification information corresponding to the type is stored in this section.

The tag ID fourth portion is a section corresponding to a serial number, and identification information corresponding to a specific name or an individual piece (lot) of the installation target is stored in this section.

As mentioned above, the tag ID recorded in the RFID tag T is constructed capable of systematic classification by contents of the tag ID first to third portions, and more detailed identification is possible by the contents of the tag ID fourth portion.

Subsequently, various types of information to be recorded in the large-capacity storage device 16 of the unified server ST of this embodiment will be described.

FIGS. 6A to 6C are diagrams conceptually illustrating a table on information by various types corresponding to each portion of the data structure of the tag ID shown in FIG. 5, and show an example of a table by application type, a table by user type, and a table by installation target type, respectively. The tables on information by various types include information recorded and held in the large-capacity storage device 16 of the unified server ST and also information recorded with the equal contents in the memory 32 of the portable terminal 2, which will be described later. The contents exemplifying the tag ID and its each portion are all noted in hexadecimal and the same applies to all the illustrations and descriptions shown below.

As shown in FIG. 6A, in the table by application type, specific names by application type offered by the service server SS ("library collection management" as illustrated, for example) is recorded corresponding to the contents of the tag ID first portion ("008C" as illustrated, for example).

Also, as shown in FIG. 6B, in the table by user type, a person who produces the RFID tag T storing the tag ID, that is, a specific name of the user having the operation terminal 3 ("Nagoya Library" as illustrated, for example) is recorded corresponding to the contents of the tag ID second portion ("0142" as illustrated, for example).

Also, as shown in FIG. 6C, in the table by target type, the type of the installation target ("book" as illustrated, for example) to which the RFID T storing the tag ID is attached (or associated) is recorded corresponding to the contents of the tag ID third portion ("2E" as illustrated, for example).

FIG. 7 is a diagram conceptually illustrating an example of an unissued tag ID list. This unissued tag ID list is also information to be recorded and held in the large-capacity storage device 16 of the unified server ST. In the unissued tag ID list, only the tag IDs (those not issued yet in the tag IDs) not recorded in any of all the RFID tags T having been actually produced are recorded in order.

In the illustrated example, in a combination of the tag ID first portion: "008C"=application type: "library collection management", the tag ID second portion: "0142"=user type: "Nagoya Library", the tag ID third portion: "2E"=installation target type: "book", the serial number of the tag ID fourth portion has been already issued (actually recorded in the RFID tag T) at the tag ID of "00~snip~007C28E" and before, and the tag ID with the serial number at "00~snip~007C28F" and after has not been issued yet. In the large-capacity storage device 16 of the unified server ST, a region storing the unissued tag ID list constitutes a tag identification information storage region in each claim.

FIG. 8 is a diagram for explaining data described in the XML format and shows an example of the data when the type of the installation target is a book. This data is also information recorded and held in the large-capacity storage device 16 of the unified server ST.

Here, so-called XML (Extensible Markup Language) is one of markup languages for describing semantics and structures of documents and data, and as shown in FIG. 8, description is made structurally using "specific character string" (so-called XML tag) between an indicator surrounded by "<" and ">" and an indicator surrounded by "</" and ">" as a basic unit.

In FIG. 8, "<tag id="008C01422E00000000000000007C28E">" indicates the tag ID (tag identification information) and the entire description between the character string "<tag id="008C01422E00000000000000007C28E">" and the character string "</tag>" constitutes single registration data (target data) of the contents corresponding to the tag ID="008C01422E00000000000000007C28E". Also, the character string "<category>" in the contents corresponds to the installation target type, the character string "<application>" to the application type, and the character string "<use>" to the user type.

In the large-capacity storage device 16 of the unified server ST, the data described in the XML format corresponding to all the tag IDs having been issued so far as above is recorded and held in the order of the tag IDs. At this time, as mentioned above, since the tag ID (tag identification information) is related to the data as <tag id="008C01422E00000000000000007C28E">", the relation itself constitutes association described in each claim, and the region storing the registration data constitutes an association storage region. Then, the region in which the tag identification information storage region (unissued tag ID list) and the association storage regions are combined constitutes a common database as an XML database.

Though not particularly shown, the common database of the unified server ST also stores systematic classification information indicating which portion of the data configuration of the tag ID corresponds to which type information, what classification is provided for each type information and the like.

A flow of information and its processing when the RFID tag T is produced in the RFID tag information system 1 of this embodiment will be described below in detail.

FIG. 9 is a diagram for conceptually explaining the flow of information and its processing around the service server SS when the RFID tag T is produced. In an example shown in FIG. 9, the service server SS is a library collection management server SSt offering a management service of collection in a library, a reference room and the like, and in a usual use, the operation terminal 3 provided at the library and the like accesses the library collection management server SSt through the wide-area network NW, searches a collection satisfying a desired condition and gets its detailed information.

On the other hand, if the operation terminal 3 produces the RFID tag T using the apparatus 4 for producing a RFID tag, the tag ID to be written in the RFID tag T is obtained from the unified server ST through the service server SS (library collection management server SSt) and book information (date of publication, name of the book, author, publisher, number of pages, date of purchase and the like) on the book corresponding to the RFID tag T is registered in the common database of the unified server ST through the service server SS (library collection management server SSt).

In FIG. 9, a user of the operation terminal 3 provided at Nagoya Library (user) inputs the book information on the book (installation target) to be newly managed in the operation terminal 3 as registration data and instructs that the RFID tag T to be attached to the book should be produced.

As a result, the operation terminal 3 requests the library collection management server SSt to issue a tag ID attached with the book information (including the contents that the installation target type is "book"). The library collection management server SSt having received the request recognizes the type of the operation terminal 3 which issued the request as the type of user and recognizes the type of application corresponding to its own application. Then, the server requests the unified server ST to issue the tag ID attached with the book information (including the installation target type="book"), the information on the user type (="Nagoya Library"), and the information on the application type (="library collection management").

The unified server ST having received the request searches the tag ID first portion, the tag ID second portion, the tag ID third portion corresponding to each of the received various type information from the table (FIGS. 6A to 6C). Then, on the basis of the combination of the tag ID first to third portions, an unissued tag ID is selected from the unissued tag ID list shown in FIG. 7 and allocated (See FIG. 10, which will be described later). This selection is preferably made in an ascending order of the serial numbers.

Then, the unified server ST transmits the newly issued tag ID to the operation terminal 3 through the service server SS, and the operation terminal 3 instructs the apparatus 4 for producing a RFID tag (nor particularly shown) to newly produce a RFID tag T by writing the received tag ID in the RFID circuit element To. The book information received by the unified server ST is registered in the common database only if the production of the RFID tag T is successful in the apparatus 4 for producing a RFID tag (which will be described later).

The tag ID newly issued in the above example is constituted by, as shown in FIG. 10, the tag ID first portion of "008C" (See FIG. 6A) corresponding to the application type of the "library collection management", the tag ID second portion of "0142" (Se FIG. 6B) corresponding to the user type of "Nagoya Library", the tag ID third portion of "2E" (See FIG. 6C) corresponding to the installation target type of the "book", and the tag ID fourth portion of "0 . . . 07C28E" of the serial number.

As the flow of information in the processing in FIG. 9, the operation terminal 3 may transmit the type of itself (user type) by attachment when the operation terminal 3 requests the service server SS to issue the tag ID or the unified server ST may recognize the type of the service server SS which made the request and obtain the application type when the service server SS requests the unified server ST to issue the tag ID. Alternatively, if the operation terminal 3 or the service server SS also stores the table of the type information and the systematic classification information, each device may transmit/receive the type information not by the name information in the text format ("library collection management", "Nagoya Library", "book" in the illustrated example) but by the information in the bit data format ("008C", "0142", "2E" in the illustrated example).

FIG. 11 is a sequence diagram illustrating a control operation and a response of the apparatus 4 for producing a RFID tag, the operation terminal 3, the service server SS, and the unified server ST in a process of producing the RFID tag T. In FIG. 11, a time series is changed from the upper side to the lower side in the figure, and a procedure of the apparatus 4 for producing a RFID tag, the operation terminal 3, the service server SS, and the unified server ST relating to the time series will be illustrated and a context of the time series will be described.

First, in a procedure CS1 of the operation terminal 3, the user inputs detailed information including the type (article information and personal information and the like; target data) of an installation target as registration data and instructs to produce the RFID tag T to be attached to the installation target. As a result, in the subsequent procedure CS2, the operation terminal 3 transmits a request signal to request issuance of the tag ID with the registration data attached to the service server SS (data output portion).

The service server SS having received the signal recognizes the type of the operation terminal 3 (=user type) of the requester of the tag ID. Then, in the subsequent procedure SS2, the server transmits a request signal to request issuance of a tag ID (allocation request signal) with the type of application of its own (=application type), the registration data (including the installation target type), and the type of the operation terminal 3 attached (allocation request output portion) to the unified server ST.

The unified server ST having received the signal searches each tag ID portion corresponding to each of the received type information in a procedure TS1, selects an unissued tag ID from the unissued tag ID list on the basis of the combination and allocates and issues it as a new tag ID (identification information issue portion). Also, in the subsequent procedure TS2, the server converts the received registration data to description in the XML format on the basis of the new tag ID and temporarily registers (temporarily stores) it in the above-mentioned mode in which the tag ID is associated with the registration data in the common database. The temporary registration at this time is recording in a volatile storage device so that the contents of the data can be arbitrarily deleted, for example.

In the subsequent procedure TS3, the unified server ST transmits the tag ID allocated in the procedure TS1 to the service server SS, and the service server SS having received it transmits the tag ID to the operation terminal 3 which requested the issuance in a procedure SS3. The operation terminal 3 having received it transmits an instruction signal (tag production instruction signal) to instruct the apparatus 4 for producing a RFID tag to newly produce a RFID tag T with the tag ID attached in a procedure CS3 (production instruction output portion).

The apparatus 4 for producing a RFID tag writes the received tag ID in the RFID circuit element To of the tag tape in a procedure MS1 (information writing portion) and determines if the writing of the tag ID has been successful or not in the subsequent procedure MS2. Even if it is determined that the writing has failed once, retry of the writing and the determination of success/failure is repeated for a predetermined number of times and if it is not successful at all, it is considered as a failure of production of the RFID tag T, and a signal of RFID tag production failure response (production failure signal) is transmitted to the operation terminal 3 (production result output portion).

The signal of RFID tag production failure response is transmitted to the unified server ST via the operation terminal 3 and the service server SS, and the unified server ST having received it in a procedure TS4 disposes of the data temporarily registered in the common database in the procedure TS2 (deletion processing; substantially erased from the common database). Also, at this time, the unified server ST leaves the tag ID the apparatus 4 for producing a RFID tag failed to record in the unissued tag ID list capable of reuse. Then, the production of the RFID tag T is considered to be failed and this sequence is finished.

On the other hand, if the apparatus 4 for producing a RFID tag determines that the writing of the tag ID has been successful (the success may be at the retry within the predetermined number of times) in the procedure MS2, the apparatus completes the RFID tag T storing the tag ID in the subsequent procedure MS3 and transmits a signal of the RFID tag production success response (production success signal) to the operation terminal 3 at the same time (production result output portion).

This signal of RFID tag production success response is also transmitted to the unified server ST via the operation terminal 3 and the service server SS, and the unified server ST having received it in a procedure TS5 formally registers the registration data temporarily registered in the common database in the procedure TS2 (finalized storage; formal registration in the common database with a right setting. Recording in a non-volatile storage device and the like, for example). At this time, the unified server ST surely deletes the tag ID the apparatus 4 for producing a RFID tag has successfully recorded from the unissued tag ID list. Then, the production of the RFID tag T is considered to be successful, and this sequence is finished.

In FIG. 11, the procedures TS2, TS4 and TS5 of the unified server ST function as data storage processing portions described in each claim.

As mentioned above, in this embodiment, by managing the tag ID in the common database of the unified server ST in a centralized manner on the premise that the tag ID stored when the RFID tag T is produced is sequentially allocated, the tag ID itself can be constructed capable of systematic classification according to predetermined regularity. As a result, when the tag ID is obtained by reading the RFID tag T, even if the registration data corresponding to the tag ID is not obtained from the common database, the contents of the registration data can be estimated to some degree from the data configuration itself of the tag ID. Therefore, in various types of information processing on the basis of the reading of the RFID tag T, processing procedures can be simplified and the processing can be expedited. As a result, convenience for users can be improved.

At this time, particularly in this embodiment, the tag ID is managed by the common database constituted by the XML database in the centralized manner. By using the general-purpose XML format, extensibility and applicability as a system can be widened.

Also, particularly in this embodiment, when the production of the RFID tag T fails, the registration data in the temporary registration state is disposed of (See the procedure TS4 in FIG. 11). As a result, the tag ID can be reused, and wasteful consumption of a storage region in the common database can be avoided.

FIG. 12 is a diagram illustrating an example when the portable terminal 2 carries out reading of the RFID tag T produced as above.

As mentioned above, in the memory 32 of the portable terminal 2, the application type table, the user type table, and the installation target type table equal to those recorded and held in the large-capacity storage device 16 of the unified server ST are stored in advance (See FIG. 6. Alternatively, it may be only a part of those three types). Also, systematic classification information indicating which portion in the data configuration of the tag ID corresponds to which type information, what classification is provided for each type information and the like is stored in the memory 32. Therefore, from any tag ID read out of all the issued RFID tags T, each type information corresponding to each of the tag ID first to third portions included in the data configuration (application type, user type, installation target type) can be singularly gotten by the portable terminal 2.

The example in FIG. 12 is an example in which a memo of a user is produced by using the above information acquisition. That is, as shown in FIG. 12, the user of the portable terminal 2 reads and collects the tag IDs from a plurality of RFID tags T in advance and has type information included in each tag ID displayed in a lump sum in the order of time of reading-out so that a simple memo can be produced. That is, the portable terminal 2 displays a part of or the whole of the application type, the user type, the installation target type and the like on the display portion 34 on the basis of a part of or the whole of the tag ID first to third portions of the tag IDs having been read and collected so far. By confirming the display on the display portion 34, the contents of the data can be estimated to some degree from the data configuration itself of the tag ID without obtaining the registration data corresponding to the tag ID form the common database of the unified sever ST. In other words, it functions as a memo to check a history of behaviors the user of the portable terminal 2 has taken so far. Further, it is possible to request/obtain the registration data corresponding to the RFID tag T the user of the portable terminal 2 wants to know particularly in detail from the unified server ST and to display more detailed information.

In the illustrated example, the three types of information of the application type, the user type, and the installation target type to each tag ID are displayed, but not limited to that. That is, as mentioned above, if a capacity of the memory 32 of the portable terminal 2 is small and the like, only one to two types of information are displayed according to that, and the table corresponding to the other type information may be omitted.

In the above, in the memory 32 of the portable terminal 2, systematic classification information indicating tables corresponding to each of type information (See FIG. 6), to which portion in the data configuration of the tag ID each type information corresponds and the like is stored in advance. However, not limited to that, the portable terminal 2 may reacquire and store the type information tables and systematic classification information by accessing the common data base of the unified server ST each time the portable terminal 2 is started or the contents of the memory 32 are erased, for example. In this way, according to the type information tables and the systematic classification information of the tag ID determined on the side of the common database of the unified server ST, the tag ID first to third portions of the tag ID read out by the portable terminal 2 from the RFID tag T and the like can be analyzed and displayed on the display portion 34. In this case, the control procedure to get the systematic classification information functions as a systematic information acquisition portion described in each claim.

Also, it may be so configured that the portable terminal 2 accesses the common database regularly so as to get version information indicating each update situation of the type information tables and systematic classification information, and if the version of the systematic classification information on the side of the common database is newer than the version of the systematic classification information on the side of the portable terminal 2, the latest type information tables and systematic classification information is gotten and stored. In this case, the control procedure to get the version information functions as a version information acquisition portion and the control procedure to request the latest systematic classification information functions as the systematic information requesting portion. As a result, the systematic classification information on the side of the portable terminal 2 can be surely updated to the latest version according to the systematic classification information on the common database side.

Also, the tables on the type information corresponding to each portion in the data structure of the tag ID (See FIG. 6) are not limited to the combination prepared each for the type information. For example, though not particularly shown, it may be so configured that a user type table is prepared corresponding to each of the application types, respectively or a target type table is prepared corresponding to each of the user types, respectively. By providing tables for each type information configured in a tree diagram (tree structure) manner as above, the tag ID second portion (or the tag ID third portion) in the same bit contents can be used in a multiple way (the tag ID second portion of the same "0142" is used by different user type tables, for example), that is, more data can be handled.

Also, other than the above described, methods by the above embodiments and each variation may be combined as appropriate for use.

Though not individually exemplified, the present invention is put into practice with various modifications within a range not departing from its gist.

What is claimed is:

1. A management system of RFID tag identification information comprising:
   a plurality of service servers configured to carry out services, each of said service servers carrying out an individual service by the corresponding individual application;
   a single unified server provided in common to said plurality of service servers via network connection;
   an operation terminal connected to the corresponding service server via network connection; and
   an apparatus for producing RFID tags connected to said operation terminal and configured to produce a RFID tag provided with a RFD circuit element including an IC circuit part storing information and a tag antenna transmitting/receiving information,
   said service server including:
   an allocation request output portion configured to output to said unified server an allocation request signal newly requesting an allocation of tag identification information, said tag identification information being given to said RFID tag corresponding to target data of an installation target of said RFID tag and;
   said unified server including:
   a common database including a tag identification information storage region in which a plurality of said tag identification information allocatable to said RFID tag not produced yet is systematically classified to be stored and held according to predetermined regularity, and an association storage region in which association between said tag identification information allocated to said RFID tag produced already and said target data corresponding to the tag identification information is stored; and
   an identification information issue portion configured to issue said tag identification information in the classification corresponding to said allocation request signal from said tag identification information storage region of said common database; and said apparatus for producing RFID tags including:

a producing apparatus antenna for radio communication with said RFID circuit element provided at a tag medium; and an information writing portion configured to write said tag identification information issued by said identification information issue portion of said unified server and gotten through said service server and said operation terminal in said IC circuit part in a state associated with said target data through said producing apparatus antenna, wherein:

said operation terminal includes a data output portion configured to output said target data to said service server, said allocation request output portion of said service server outputs said target data from said data output portion along with said allocation request signal to said unified server;

said unified server further includes a data storage processing portion configured to link said tag identification information issued by said identification information issue portion in response to said allocation request signal with said target data input from said service server along with said allocation request signal and store the linkage in said association storage region as said association; and said operation terminal further includes a production instruction output portion configured to output a tag production instruction signal instructing production of a RFID tag along with said tag identification information issued by said identification information issue portion of said unified server and gotten through said service server to said apparatus for producing RFID tags; and said information writing portion of said apparatus for producing RFID tags writes said tag identification information gotten from said production instruction output portion of said operation terminal along with said tag production instruction signal in said IC circuit part, and wherein:

said tag identification information includes a first portion indicating a type of said individual application used in said service server, a second portion indicating identification information of said operation terminal, and a third portion indicating a type of said target data said tag identification information storage region of said common database stores and holds said plurality of tag identification information systematically classified according to the contents of said first to third portions included therein respectively; and said identification information issue portion of said unified server searches said tag identification information corresponding to the type of said individual application, the identification information of said operation terminal and the type of said target data corresponding to said allocation request signal and issues the searched information.

2. The management system of RFID tag identification information according to claim 1, further comprising a RFID tag reading device, said RFID tag reading device including: a reading device antenna for radio communication with said RFID circuit element provided at said RFID tag produced; an information reading portion configured to get said tag identification information from said IC circuit part of said RFID circuit element through said reading device antenna; and a type display device configured to display at least a part of the type of said individual application, the identification information of said operation terminal, and the type of said target data on the basis of at least a part of said first to third portions included in said tag identification information gotten by said information reading portion.

3. The management system of RFID tag identification information according to claim 2, wherein: said RFID tag reading device further includes a systematic information acquisition portion configured to get systematic classification information of said tag identification information using said first to third portions from said unified server; and said type display device makes said display on the basis of at least the part of said first to third portions included in said tag identification information gotten by said information reading portion referring to said systematic classification information gotten by said systematic information acquisition portion.

4. The management system of RFID tag identification information according to claim 3, wherein: said RFID tag reading device further includes: a version information acquisition portion configured to get version information of said systematic classification information from said unified server; and a systematic information requesting portion configured to request said unified server to transmit the latest one of said systematic classification information in the case that the version information gotten by said version information acquisition portion is newer than the version of said systematic classification information already gotten by said systematic information acquisition portion.

5. The management system of RFID tag identification information according to claim 4, wherein: said common database is an XML database using an XML format as said data format.

6. A management system of RFID tag identification information comprising:

a plurality of service servers configured to carry out services, each of said service servers carrying out an individual service by the corresponding individual application;

a single unified server provided in common to said plurality of service servers via network connection;

an operation terminal connected to the corresponding service server via network connection; and an apparatus for producing RFID tags connected to said operation terminal and configured to produce a RFD tag provided with a RFID circuit element including an IC circuit part storing information and a tag antenna transmitting/receiving information, said service server including:

an allocation request output portion configured to output to said unified server an allocation request signal newly requesting an allocation of tag ID of desired bits as tag identification information, said tag ID being given to said RFID tag corresponding to target data of an installation target of said RFID tag and;

said unified server including:

a common database including a tag ID storage region in which a plurality of said tag IDs allocatable to said RFID tag not produced yet is systematically and searchably classified to be stored and held according to predetermined regularity by using a tag ID portion that has less bits than said desired bits and is included in each of the tag IDs, and an association storage region in which association between said tag ID allocated to said RFID tag produced already and said target data corresponding to the tag ID is stored; and an identification information issue portion configured to issue said tag ID in the classification corresponding to said allocation request signal from said tag ID storage region of said common database; and said apparatus for producing RFID tags including:
a producing apparatus antenna for radio communication with said RFID circuit element provided at a tag medium; and
an information writing portion configured to write said tag ID issued by said identification information issue portion of said unified server and gotten through said service server and said operation terminal in said IC circuit part in a state associated with said target data through said producing apparatus antenna.

* * * * *